US012673616B2

(12) United States Patent
Huebner et al.

(10) Patent No.: US 12,673,616 B2
(45) Date of Patent: Jul. 7, 2026

(54) CENTER CONSOLE FOR A VEHICLE

(71) Applicant: Ford Global Technologies, LLC, Dearborn, MI (US)

(72) Inventors: Martin Huebner, Bergisch Gladbach (DE); Tim Klausmann, Heinsberg (DE); Bernd Ottlik, Pulheim (DE); Marc Bisdorf, Cologne (DE); Robin Advena, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 18/494,924

(22) Filed: Oct. 26, 2023

(65) Prior Publication Data

US 2024/0166136 A1 May 23, 2024

(30) Foreign Application Priority Data

Nov. 17, 2022 (DE) .......................... 102022130419.1

(51) Int. Cl.
B60R 7/04 (2006.01)
B60R 7/08 (2006.01)
B60S 3/04 (2006.01)

(52) U.S. Cl.
CPC .................. B60R 7/04 (2013.01); B60R 7/08 (2013.01); *B60S 3/045* (2013.01)

(58) Field of Classification Search
CPC .... B60R 7/00; B60R 7/04; B60R 7/08; B60R 2011/007; B60S 3/045
USPC .................................... 296/24.34, 24.4, 37.8
See application file for complete search history.

(56) References Cited

U.S. PATENT DOCUMENTS

| | | | | |
|---|---|---|---|---|
| 3,517,978 A | * | 6/1970 | Hudson ..................... | B60R 7/04 |
| | | | | 312/235.8 |
| 6,966,450 B2 | * | 11/2005 | Askew ................... | B65D 25/06 |
| | | | | 62/457.7 |
| 10,807,538 B2 | | 10/2020 | Leifheit | |
| 11,198,381 B2 | * | 12/2021 | Vite Cadena .......... | B60N 3/103 |
| 2007/0194071 A1 | * | 8/2007 | Hollinger .................. | B60R 7/00 |
| | | | | 224/403 |
| 2016/0090047 A1 | * | 3/2016 | Huebner .................. | B60Q 3/78 |
| | | | | 296/24.34 |

FOREIGN PATENT DOCUMENTS

| | | | |
|---|---|---|---|
| DE | 202005003636 U1 | 5/2005 | |
| DE | 102006030475 A1 | 1/2008 | |

* cited by examiner

*Primary Examiner* — Jason S Daniels
(74) *Attorney, Agent, or Firm* — Vichit Chea; Price Heneveld LLP

(57) ABSTRACT

A center console for a vehicle, has at least one storage chamber, laterally delimited on both sides by two side walls, and at least one dividing element, arranged in the storage chamber and which serves for subdividing the storage chamber. In order to provide a center console having a storage chamber which can be adapted to articles that are to be stored, the center console has at least two upwardly open holding slots which are arranged in the storage chamber and are mutually spaced in a transverse direction of the center console and which are arranged mutually oppositely on the side walls such that the dividing element can, at edges, be at least partially inserted into the holding slots from above.

14 Claims, 2 Drawing Sheets

CENTER CONSOLE FOR A VEHICLE

CROSS-REFERENCE TO RELATED APPLICATION

This application claims foreign priority benefits under 35 U.S.C § 119(a)-(d) to German Patent Application No. 102022130419.1 filed on Nov. 17, 2022, which is hereby incorporated by reference in its entirety.

FIELD OF THE DISCLOSURE

The present disclosure generally relates to a center console for a vehicle, and more particularly relates to a vehicle center console having a storage chamber, which is laterally delimited on both sides by two side walls and at least one dividing element, which can be arranged in the storage chamber, and which serves for subdividing the storage chamber.

BACKGROUND OF THE DISCLOSURE

Motor vehicles may be equipped with a center console. A center console of a vehicle normally extends rearwardly from a knee region between two front footwells as far as between two front seats. Such center consoles can take a wide variety of forms, and normally have at least one functional unit, for example a beverage holder or the like. A main storage chamber of a center console is normally of relatively large dimensions, which may make it difficult for certain articles to be stored in the main storage chamber. For example, beverage bottles generally cannot be stored upright in the main storage chamber without being susceptible to falling over while the vehicle is in motion. Relatively small articles may slide and move around within the main storage chamber while the vehicle is in motion, which may result in noises and can cause damage to the articles. If several articles are stored in the main storage chamber simultaneously, access to the individual articles may be furthermore relatively restricted.

It would be desirable to provide for a center console having a storage chamber which can be adapted to articles that are to be stored.

SUMMARY OF THE DISCLOSURE

According to a first aspect of the present disclosure, a center console for a vehicle includes a storage chamber laterally delimited on both sides by two side walls, a dividing element configured to be arranged in the storage chamber for subdividing the storage chamber, and at least two upwardly open holding slots arranged in the storage chamber, wherein the at least two upwardly open holding slots are mutually spaced in a transverse direction of the center console and arranged mutually oppositely on the two side walls such that the dividing element can, at edges, be at least partially inserted into the at least two upwardly open holding slots from above.

Embodiments of the first aspect of the present disclosure can include any one or a combination of the following features:

the mutually opposite holding slots and the dividing element are configured such that the dividing element, when at least partially inserted into the holding slots, is held in the holding slots with a self-locking action;

three pairs of mutually opposite holding slots are arranged on the side walls so as to be uniformly mutually spaced in a longitudinal direction of the center console, wherein rearwardly or forwardly offset in relation to the forward pair of mutually opposite holding slots, there is arranged at least one additional pair of mutually opposite holding slots, which are spaced in the longitudinal direction of the center console from the forward pair of mutually opposite holding slots by less than a spacing between two other pairs, which are adjacent in the longitudinal direction of the center console, of mutually opposite holding slots;

the additional pair of mutually opposite holding slots has a smaller height than the other pairs of mutually opposite holding slots;

the dividing element is configured as an ice scraper; and the dividing element has, on mutually opposite sides, holding rails of constant material thickness which can be inserted into the relevant pair of mutually opposite holding slots from above.

According to a second aspect of the present disclosure, a center console for a vehicle includes a storage chamber laterally delimited on both sides by two side walls, a dividing element configured to be arranged in the storage chamber for subdividing the storage chamber, and at least two upwardly open holding slots arranged in the storage chamber, wherein the at least two upwardly open holding slots are mutually spaced in a transverse direction of the center console and arranged mutually oppositely on the two side walls such that the dividing element is, at edges, at least partially inserted into the at least two upwardly open holding slots from above, wherein the mutually opposite holding slots and the dividing element are configured such that the dividing element, which is at least partially inserted into the holding slots, is held in the holding slots with a self-locking action, wherein three pairs of mutually opposite holding slots are arranged on the side walls so as to be uniformly mutually spaced in a longitudinal direction of the center console, wherein, rearwardly or forwardly offset in relation to the forward pair of mutually opposite holding slots, there is arranged at least one additional pair of mutually opposite holding slots, which are spaced in the longitudinal direction of the center console from the forward pair of mutually opposite holding slots by less than the spacing between two other pairs, which are adjacent in the longitudinal direction of the center console, of mutually opposite holding slots Embodiments of the second aspect of the present disclosure can include any one or a combination of the following features:

the additional pair of mutually opposite holding slots has a smaller height than the other pairs of mutually opposite holding slots;

the dividing element is configured as an ice scraper; and the dividing element has, on mutually opposite sides, holding rails of constant material thickness which can be inserted into the relevant pair of mutually opposite holding slots from above.

According to a third aspect of the present disclosure, a vehicle includes a center console comprising of a storage chamber laterally delimited on both sides by two side walls, a dividing element configured to be arranged in the storage chamber for subdividing the storage chamber, and at least two upwardly open holding slots arranged in the storage chamber, wherein at least two upwardly open holding slots are mutually spaced in a transverse direction of the center console and arranged mutually oppositely on the two side walls such that the dividing element can, at edges, be at least partially inserted into the at least two upwardly open holding slots from above.

Embodiments of the third aspect of the present disclosure can include any one or a combination of the following features:

the mutually opposite holding slots and the dividing element are configured such that the dividing element, when at least partially inserted into the holding slots, is held in the holding slots with a self-locking action;

three pairs of mutually opposite holding slots are arranged on the side walls so as to be uniformly mutually spaced in a longitudinal direction of the center console, wherein, rearwardly or forwardly offset in relation to the forward pair of mutually opposite holding slots, there is arranged at least one additional pair of mutually opposite holding slots, which are spaced in the longitudinal direction of the center console from the forward pair of mutually opposite holding slots by less than a spacing between two other pairs, which are adjacent in the longitudinal direction of the center console, of mutually opposite holding slots;

the additional pair of mutually opposite holding slots has a smaller height than the other pairs of mutually opposite holding slots;

the dividing element is configured as an ice scraper; and the dividing element has, on mutually opposite sides, holding rails of constant material thickness which can be inserted into the relevant pair of mutually opposite holding slots from above.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
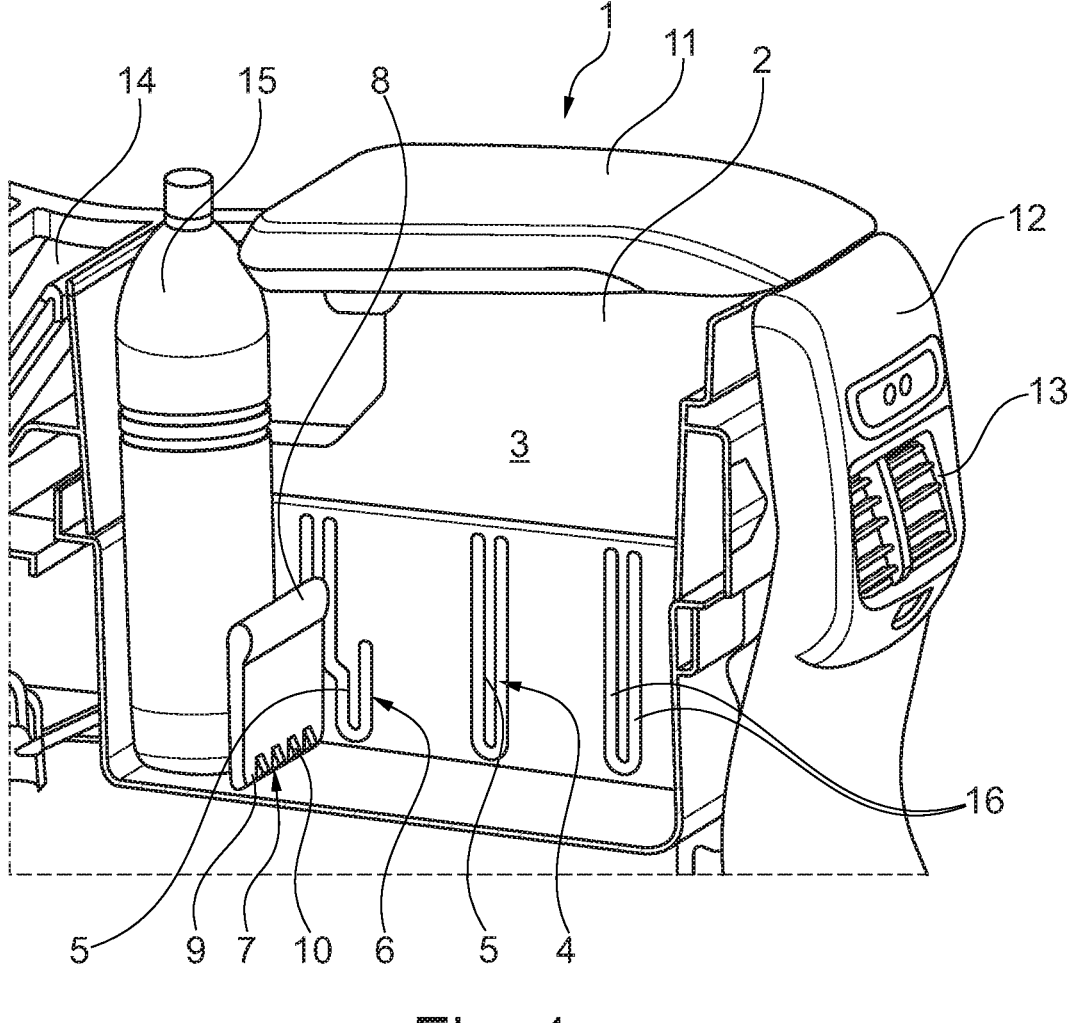
FIG. 1 is a schematic and perspective longitudinal sectional illustration of an exemplary embodiment of a center console.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale, and certain components are enlarged relative to the other components for purposes of emphasis and understanding.

In the various figures, identical parts are always denoted by the same reference designations, for which reason the parts are generally also described only once. FIG. 1 is a schematic and perspective longitudinal sectional illustration of an exemplary embodiment of a center console 1 for a vehicle that is not shown. The center console 1 has a storage chamber 3, which is laterally delimited on both sides by two side walls 2, of which only one side wall 2 is shown.

Three pairs of mutually opposite, upwardly open holding slots 5, which are mutually spaced in a transverse direction of the center console 1, are arranged in the storage chamber 3 or on the side walls 2, wherein only one holding slot 5 of each pair 4 is shown, and wherein the pairs 4 are uniformly mutually spaced in a longitudinal direction of the center console. The holding slots 5 of the pairs 4 extend approximately over half of the height of the storage chamber Rearwardly offset in relation to the forward pair 4 of mutually opposite holding slots 5, there is arranged an additional pair 6 of mutually opposite holding slots 5, which are spaced in the longitudinal direction of the center console 1 from the forward pair 4 of mutually opposite holding slots 5 by less than the spacing between two other pairs 4, which are adjacent in the longitudinal direction of the center console 1, of mutually opposite holding slots 5. The additional pair 6 of mutually opposite holding slots 5 has a smaller height than the other pairs 4 of mutually opposite holding slots 5.

The relevant holding slot 5 is formed in the manner of a channel between two beads 16 which run in a vertical direction of the center console 1, parallel to one another, and with a lateral mutual spacing.

The center console 1 furthermore has a dividing element 7, arranged in the storage chamber 3, for subdividing the storage chamber 3. Here, the holding slots 5 of each pair 4 and 6 are arranged mutually oppositely on the side walls 2 such that the dividing element 7 can, at edges, be at least partially inserted into the holding slots 5 from above.

The dividing element 7 is configured as an ice scraper. The dividing element 7 has, on mutually opposite sides, holding rails (shown in FIG. 2) of constant material thickness which are inserted into the relevant pair 4 or 6 of mutually opposite holding slots 5 from above. The dividing element 7 furthermore has, at one side, a thickened grip portion 8 and, at a side situated opposite the aforementioned side, a thickened scraping portion 9 with scraping projections 10.

In the illustrated state of the center console 1, the dividing element has been arranged on the forward pair 4 of mutually opposite holding slots 5 in order to be able to hold a beverage bottle 15 upright in the storage chamber 3.

The storage chamber 3 is partially closable at its top side by an armrest 11 of the center console 1, as shown in FIG. 1. In order to open up the storage chamber 3, the armrest 11 may be arranged pivotably about a rearward pivot axis (not shown), which runs in a transverse direction of the center console 1, so as to be pivotable between the illustrated horizontal armrest position and a vertical opening position (not shown). In the horizontal armrest position of the armrest 11, a forward region of the storage chamber 3 remains accessible in order that the beverage bottle 15 can be inserted into and removed from the storage chamber 3.

On the rearward side, the center console 1 furthermore has a paneling element 12 with air outlet openings 13 in order to allow air to be introduced into the rear of the vehicle. At least one stowage compartment 14 is formed on the center console 1 forward of the storage chamber 3.

Figure 2:
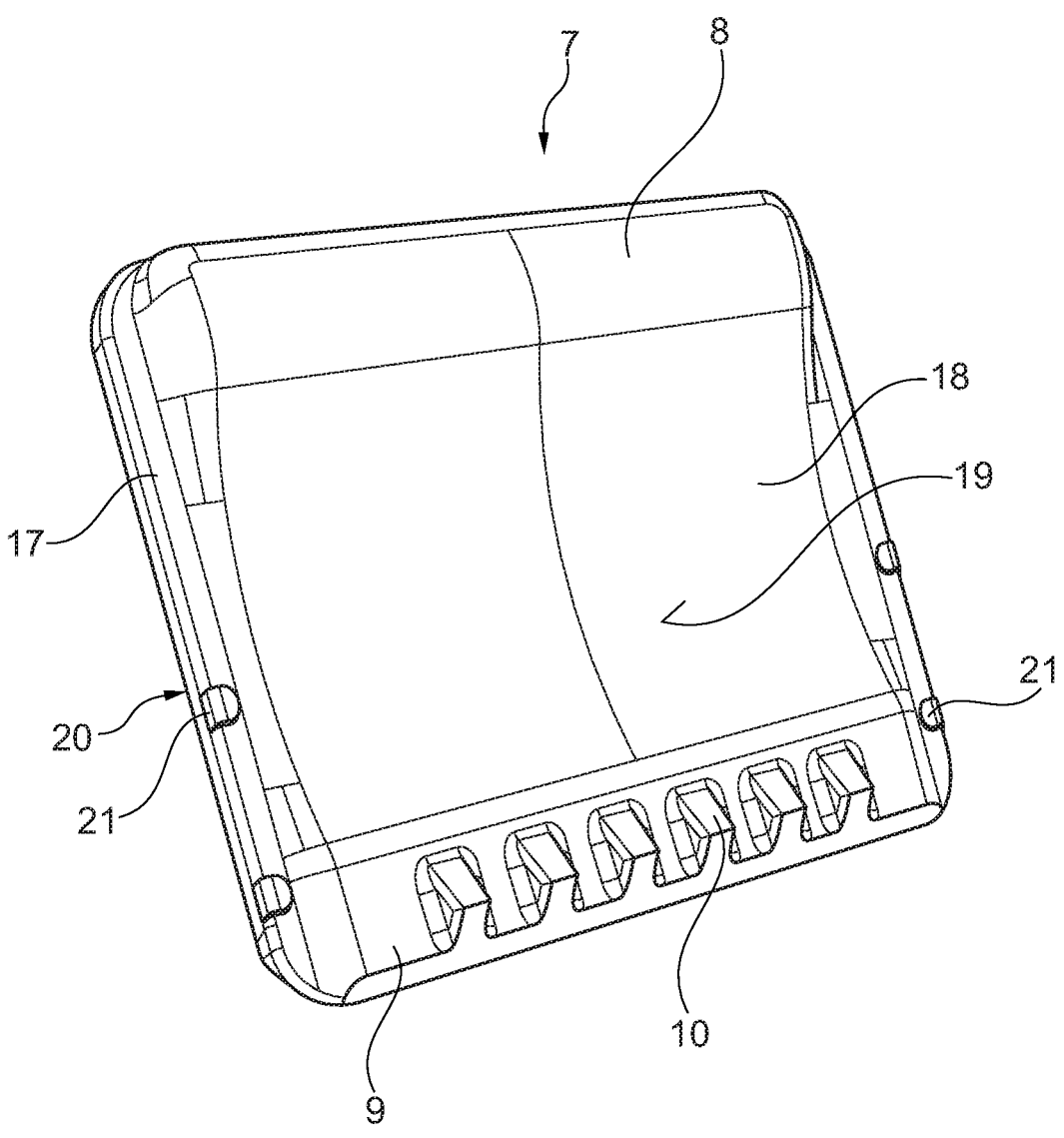
FIG. 2 is a schematic and perspective illustration of the dividing element shown in FIG. 1.

FIG. 2 is a schematic and perspective illustration of the dividing element 7 shown in FIG. 1. In addition to FIG. 1, the two lateral holding rails 17 of the dividing element 7 are shown, which each have a constant material thickness. Furthermore, between the grip portion 8 and the scraper portion 9, there is a middle portion 18 of relatively small material thickness, wherein the material thickness of the middle portion 18 increases continuously both in the direction of the grip portion 8 and in the direction of the scraper portion 9, such that the front side 19, facing toward the viewer of FIG. 2, of the middle portion 18 is concave, while a rear side of the dividing element 7, which faces away from the viewer, is planar.

By way of example, two stud-like second material portions 21 are formed on each holding rail 17 in series with one another and with a mutual spacing. These thickened material portions 21 have the effect that the dividing element 7, when it has been at least partially inserted into the mutually opposite holding slots 5, is held in the holding slots 5 with a self-locking action.

According to the disclosure, a center console is disclosed as having at least two upwardly open holding slots which are arranged in the storage chamber and are mutually spaced in a transverse direction of the center console, and which are arranged mutually oppositely on the side walls such that the dividing element can, at edges, be at least partially inserted into the holding slots from above.

The features and measures individually specified in the description may be combined with one another in any technically meaningful way and reveal further embodiments of the center console. The description additionally characterizes and specifies the center console, in particular in conjunction with the figures.

According to the disclosure, the storage chamber can be subdivided by a user as required, for example, into two smaller storage chambers, by virtue of the dividing element being inserted from above into the pair of mutually opposite holding slots. In this way, it is for example possible for a beverage bottle to be placed upright into one of the smaller storage chambers, without the risk of the beverage bottle falling over while the vehicle is in motion. Furthermore, with the subdivision of the storage chamber, it can be achieved that relatively small articles do not slide around within the storage chamber while the vehicle is in motion, which could cause disturbing noises and damage to the articles. It is furthermore possible for multiple articles to be distributed between the individual smaller storage chambers, such that the individual articles remain relatively easily accessible within the storage chamber.

The dividing element may for example be of plate-like form. The dividing element has a width that is adapted to the mutual spacing of the holding slots in a transverse direction of the center console, such that the dividing element can be partially or entirely inserted, from above, into both holding slots simultaneously. The dividing element has a height which may be less than a height of the storage chamber, for example of less than 50% of the height of the storage chamber.

The two side walls which laterally delimit the storage chamber on both sides run mutually parallel in a longitudinal direction of the center console. The holding slots may extend over only a lower part of the relevant side wall, for example over less than a lower half of the relative side wall. The holding slots may for example be configured as straight channels running in a vertical direction of the center console. For this purpose, it is for example possible for beads, which run mutually parallel and with a mutual spacing, to be arranged on the relevant side wall, between which beads the relevant channel, or the relevant holding slot is formed.

The center console according to the disclosure may in particular be installed in a vehicle in the form of a motor vehicle, for example a passenger motor vehicle or utility motor vehicle. Such a vehicle therefore constitutes a further aspect according to the disclosure.

In one advantageous embodiment, the mutually opposite holding slots and the dividing element are configured such that the dividing element, when it has been at least partially inserted into the holding slots, is held in the holding slots with a self-locking action. The self-locking action can allow the dividing element to be vertically positioned in a freely selectable manner relative to the mutually opposite holding slots and thus the side walls. The center console can thus be adapted to different heights of a center of gravity of different articles and/or bottles, such that, for example, relatively large bottles with a relatively high center of gravity can be prevented from falling over within the center console. Here, the height of the mutually opposite holding slots may be greater than the height of the dividing element arranged on the holding slots.

In a further advantageous embodiment, three pairs of mutually opposite holding slots are arranged on the side walls so as to be uniformly mutually spaced in a longitudinal direction of the center console, wherein, rearwardly or forwardly offset in relation to the forward pair of mutually opposite holding slots, there is arranged at least one additional pair of mutually opposite holding slots, which are spaced in the longitudinal direction of the center console from the forward pair of mutually opposite holding slots by less than the spacing between two other pairs, which are adjacent in the longitudinal direction of the center console, of mutually opposite holding slots. The dividing element can be inserted selectively into one of the pairs of mutually opposite holding slots such that the storage chamber be subdivided in various ways, enabling the storage chamber to be easily adapted by the user to the relevant requirements or dimensioning of articles that are to be stored therein. Here, two pairs of mutually opposite holding slots are arranged in the forward region of the storage chamber. These two pairs of mutually opposite holding slots arranged in a forward position are arranged closer together than the other pairs of mutually opposite holding slots, such that a forward portion of the storage chamber that is partitioned off using the dividing element can be adapted relatively exactly to the width of a beverage container that is to be inserted therein.

In a further advantageous embodiment, the additional pair of mutually opposite holding slots has a smaller height than the other pairs of mutually opposite holding slots. The additional pair of mutually opposite holding slots may be used, for example to divide the storage chamber in a ⅓-⅔ configuration. Owing to the relatively small height of the mutually opposite holding slots of the additional holding slot pair, the dividing element can be inserted into and pulled out of these holding slots even when a cupholder has been inserted into an upper region of the storage chamber.

In a further advantageous embodiment, the dividing element has a further function, and is configured for example as an ice scraper. The dividing element is thus configured as a multifunctional element that has two functions, specifically the dividing function and the ice scraper function. In particular in the case of a vehicle in the form of an electric vehicle, the dividing element or ice scraper offers an alternative to defrosting the windshield using electrical energy. Manually removing ice from a vehicle window using the ice scraper saves electrical energy, thus avoiding range losses. A storage facility is furthermore provided for an ice scraper, which can be used as a dividing element when not required.

In a further advantageous embodiment, the dividing element has on mutually opposite sides, holding rails of constant material thickness which can be inserted into the relevant pair of mutually opposite holding slots from above. The material thickness of the holding rails corresponds to the width of the holding slots. Between the holding rails, the dividing element may be of greater thickness at least in certain regions, for example in order to exhibit the physical features of an ice scraper.

In the context of the disclosure, the function of an ice scraper may be not the only function that the dividing element has in addition to dividing up the storage chamber. Other functions of the dividing element are also conceivable, which may also be provided in addition to the ice scraper function. For example, a rear side of the dividing element may be lined with an absorbent pad element that is suitable for removing dirt or condensation from the inside of vehicle windows, in particular windshields. Here, the pad is self-evidently spaced from the scraping edge so as to prevent the pad from being destroyed during use of the ice scraper. Alternatively, the dividing element may for example be configured as a vanity mirror, parking disk or the like and thus likewise have more than a single function.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A center console for a vehicle, the center console comprising:
  a storage chamber laterally delimited on both sides by two side walls;
  a dividing element configured to be arranged in the storage chamber for subdividing the storage chamber;
  at least two upwardly open holding slots arranged in the storage chamber, wherein the at least two upwardly open holding slots are mutually spaced in a transverse direction of the center console and arranged mutually oppositely on the two side walls such that the dividing element can, at edges, be at least partially inserted into the at least two upwardly open holding slots from above; and
  three pairs of mutually opposite holding slots are arranged on the side walls so as to be uniformly mutually spaced in a longitudinal direction of the center console, wherein rearwardly or forwardly offset in relation to a forward pair of mutually opposite holding slots, there is arranged at least one additional pair of mutually opposite holding slots, which are spaced in the longitudinal direction of the center console from the forward pair of mutually opposite holding slots by less than a spacing between two other pairs, which are adjacent in the longitudinal direction of the center console, of mutually opposite holding slots.

2. The center console according to claim 1, wherein the mutually opposite holding slots and the dividing element are configured such that the dividing element, when at least partially inserted into the holding slots, is held in the holding slots with a self-locking action.

3. The center console according to claim 1, wherein the additional pair of mutually opposite holding slots has a smaller height than the other pairs of mutually opposite holding slots.

4. The center console according to claim 1, wherein the dividing element is configured as an ice scraper.

5. The center console according to claim 4, wherein the dividing element has, on mutually opposite sides, holding rails of constant material thickness which can be inserted into the relevant pair of mutually opposite holding slots from above.

6. A center console for a vehicle, the center console comprising:
  a storage chamber laterally delimited on both sides by two side walls;
  a dividing element configured to be arranged in the storage chamber for subdividing the storage chamber; and at least two upwardly open holding slots arranged in the storage chamber, wherein the at least two upwardly open holding slots are mutually spaced in a transverse direction of the center console and arranged mutually oppositely on the two side walls such that the dividing element is, at edges, at least partially inserted into the at least two upwardly open holding slots from above, wherein the mutually opposite holding slots and the dividing element are configured such that the dividing element, which is at least partially inserted into the holding slots, is held in the holding slots with a self-locking action, wherein three pairs of mutually opposite holding slots are arranged on the side walls so as to be uniformly mutually spaced in a longitudinal direction of the center console, wherein, rearwardly or forwardly offset in relation to a forward pair of mutually opposite holding slots, there is arranged at least one additional pair of mutually opposite holding slots, which are spaced in the longitudinal direction of the center console from the forward pair of mutually opposite holding slots by less than the spacing between two other pairs, which are adjacent in the longitudinal direction of the center console, of mutually opposite holding slots.

7. The center console according to claim 6, wherein the additional pair of mutually opposite holding slots has a smaller height than the other pairs of mutually opposite holding slots.

8. The center console according to claim 6, wherein the dividing element is configured as an ice scraper.

9. The center console according to claim 8, wherein the dividing element has, on mutually opposite sides, holding rails of constant material thickness which can be inserted into the relevant pair of mutually opposite holding slots from above.

10. A vehicle comprising:
  a center console comprising:
    a storage chamber laterally delimited on both sides by two side walls;
    a dividing element configured to be arranged in the storage chamber for subdividing the storage chamber, wherein the dividing element is configured as an ice scraper; and
    at least two upwardly open holding slots arranged in the storage chamber, wherein at least two upwardly open holding slots are mutually spaced in a transverse direction of the center console and arranged mutually oppositely on the two side walls such that the dividing element can, at edges, be at least partially inserted into the at least two upwardly open holding slots from above.

11. The vehicle according to claim 10, wherein the mutually opposite holding slots and the dividing element are configured such that the dividing element, when at least partially inserted into the holding slots, is held in the holding slots with a self-locking action.

12. The vehicle according to claim 10, wherein three pairs of mutually opposite holding slots are arranged on the side walls so as to be uniformly mutually spaced in a longitudinal direction of the center console, wherein, rearwardly or forwardly offset in relation to a forward pair of mutually opposite holding slots, there is arranged at least one additional pair of mutually opposite holding slots, which are spaced in the longitudinal direction of the center console from the forward pair of mutually opposite holding slots by less than a spacing between two other pairs, which are adjacent in the longitudinal direction of the center console, of mutually opposite holding slots.

13. The vehicle according to claim 12, wherein the additional pair of mutually opposite holding slots has a smaller height than the other pairs of mutually opposite holding slots.

14. The vehicle according to claim 10, wherein the dividing element has, on mutually opposite sides, holding rails of constant material thickness which can be inserted into the relevant pair of mutually opposite holding slots from above.

\* \* \* \* \*